United States Patent
Han et al.

(10) Patent No.: US 9,733,776 B2
(45) Date of Patent: Aug. 15, 2017

(54) TOUCH PANEL

(71) Applicant: Samsung Display Co., Ltd., Yongin (KR)

(72) Inventors: In Young Han, Cheonan-si (KR); Yeon Tae Kim, Yongin-si (KR); Young Soo No, Seoul (KR); Hwan-Hee Jeong, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 35 days.

(21) Appl. No.: 14/813,412

(22) Filed: Jul. 30, 2015

(65) Prior Publication Data
US 2016/0202792 A1    Jul. 14, 2016

(30) Foreign Application Priority Data
Jan. 12, 2015  (KR) .......................... 10-2015-0004343

(51) Int. Cl.
*G06F 3/044* (2006.01)

(52) U.S. Cl.
CPC .... *G06F 3/044* (2013.01); *G06F 2203/04111* (2013.01); *G06F 2203/04112* (2013.01)

(58) Field of Classification Search
CPC ................ G06F 3/044; G06F 3/047; G06F 2203/04111; G06F 2203/04112; G06F 2203/04102; G06F 2203/04103
See application file for complete search history.

(56) References Cited

U.S. PATENT DOCUMENTS

| | | | |
|---|---|---|---|
| 2012/0062510 A1* | 3/2012 | Mo ......................... | G06F 3/044 345/174 |
| 2012/0299638 A1* | 11/2012 | Han ....................... | G06F 3/044 327/517 |
| 2014/0022467 A1* | 1/2014 | Chai ................... | G02F 1/13338 349/12 |
| 2014/0313435 A1* | 10/2014 | Cho ......................... | H01J 9/20 349/12 |
| 2015/0205405 A1* | 7/2015 | Yumoto .................. | G06F 3/044 345/174 |
| 2015/0253909 A1* | 9/2015 | Kim ........................ | G06F 3/047 345/173 |

(Continued)

FOREIGN PATENT DOCUMENTS

| | | |
|---|---|---|
| JP | 2014-115694 | 6/2014 |
| KR | 10-1322333 | 10/2013 |

(Continued)

*Primary Examiner* — Tom Sheng
(74) *Attorney, Agent, or Firm* — H.C. Park & Associates, PLC

(57) ABSTRACT

A touch panel includes: a substrate; a plurality of first touch electrodes and a plurality of second touch electrodes disposed on the substrate and formed in a mesh pattern; a plurality of first connection parts connecting adjacent first touch electrodes and formed in the mesh pattern; and a plurality of second connection parts connecting adjacent second touch electrodes. The second connection part may include first and second contact parts overlapping the adjacent second touch electrodes, respectively, and a leg part connecting the first and second contact parts and a width of the leg part may be narrower than that of an opening of the mesh pattern.

19 Claims, 9 Drawing Sheets

(56) References Cited

U.S. PATENT DOCUMENTS

| | | | |
|---|---|---|---|
| 2015/0261370 A1* | 9/2015 | Yoo | G06F 3/0412 345/173 |
| 2015/0301632 A1* | 10/2015 | Hirata | G06F 3/041 345/173 |
| 2016/0048248 A1* | 2/2016 | Na | G06F 3/044 345/174 |
| 2016/0070406 A1* | 3/2016 | Han | G06F 3/044 345/173 |
| 2016/0103517 A1* | 4/2016 | Kang | G06F 3/044 345/174 |
| 2016/0103519 A1* | 4/2016 | Zeng | G06F 3/044 345/174 |
| 2016/0246405 A1* | 8/2016 | Hu | G06F 3/044 |

FOREIGN PATENT DOCUMENTS

| | | |
|---|---|---|
| KR | 10-2014-0014593 | 2/2014 |
| KR | 10-2014-0040432 | 4/2014 |
| KR | 10-1379963 | 4/2014 |
| KR | 10-2014-0051649 | 5/2014 |

\* cited by examiner

TOUCH PANEL

CROSS REFERENCE TO RELATED APPLICATION

This application claims priority from and the benefit of Korean Patent Application No. 10-2015-0004343, filed on Jan. 12, 2015, which is hereby incorporated by reference for all purposes as if fully set forth herein.

BACKGROUND

Field

Exemplary embodiments relate to a touch panel including a touch sensor, and a display device including the same.

Discussion of the Background

A flat panel display (FPD) such as an organic light emitting diode display (OLED), a liquid crystal display (LCD), an electrophoretic display (EPD), or the like, typically includes a display panel in which an electric field generating electrode and an electro-optical active layer are formed. Panels of each of the organic light emitting diode display, the liquid crystal display, and the electrophoretic display may include an organic emission layer, an active layer, and particles charged with electric charges as the electro-optical active layer, respectively. The electric field generating electrode may be connected to a switching device such as a thin film transistor, or the like, to receive a data signal, and the electro-optical active layer may convert the data signal into an optical signal to display an image.

These display devices may include touch sensor so that a user may interact with the display panel in addition to viewing an image on the display panel. A panel in which the touch sensor is formed is commonly referred to as a touch sensor (or a touch sensor panel, a touch screen panel, or the like). A display panel having a touch sensor may also be referred to as a touch panel. The touch sensor indicates touch information when the user touches a screen using his/her finger, a touch pen, or the like, by sensing a change in pressure, electric charges, light, or the like, applied to the screen. The touch information may include whether or not an object touches the screen, a touch position, and the like. The display device may output an image signal based on the touch information.

Touch sensing may be implemented by a capacitive touch sensor including touch electrodes. In the capacitive touch sensor, the touch electrodes form a capacitor and may sense a change in a capacitance of a capacitor generated by a touch. The touch information may be generated based on the change in the capacitance during the touch.

When the touch electrodes are alternately disposed in a plane, connection parts connecting the touch electrodes may overlap each other. In this case, the more the overlapping area increases, the more parasitic capacitance increases, resulting in reduced touch sensitivity.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel including a touch sensor and a display device including the same having excellent signal sensitivity performance by reducing parasitic capacitance.

Additional aspects will be set forth in the detailed description which follows, and, in part, will be apparent from the disclosure, or may be learned by practice of the inventive concept.

An exemplary embodiment discloses a touch panel, including: a substrate; a plurality of first touch electrodes and a plurality of second touch electrodes disposed on the substrate and formed in a mesh pattern; a plurality of first connection parts connecting adjacent first touch electrodes and formed in the mesh pattern; and a plurality of second connection parts connecting adjacent second touch electrodes. The second connection part may include first and second contact parts overlapping the adjacent second touch electrodes, respectively, and a leg part connecting the first and second contact parts and a width of the leg part may be narrower than that of an opening of the mesh pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
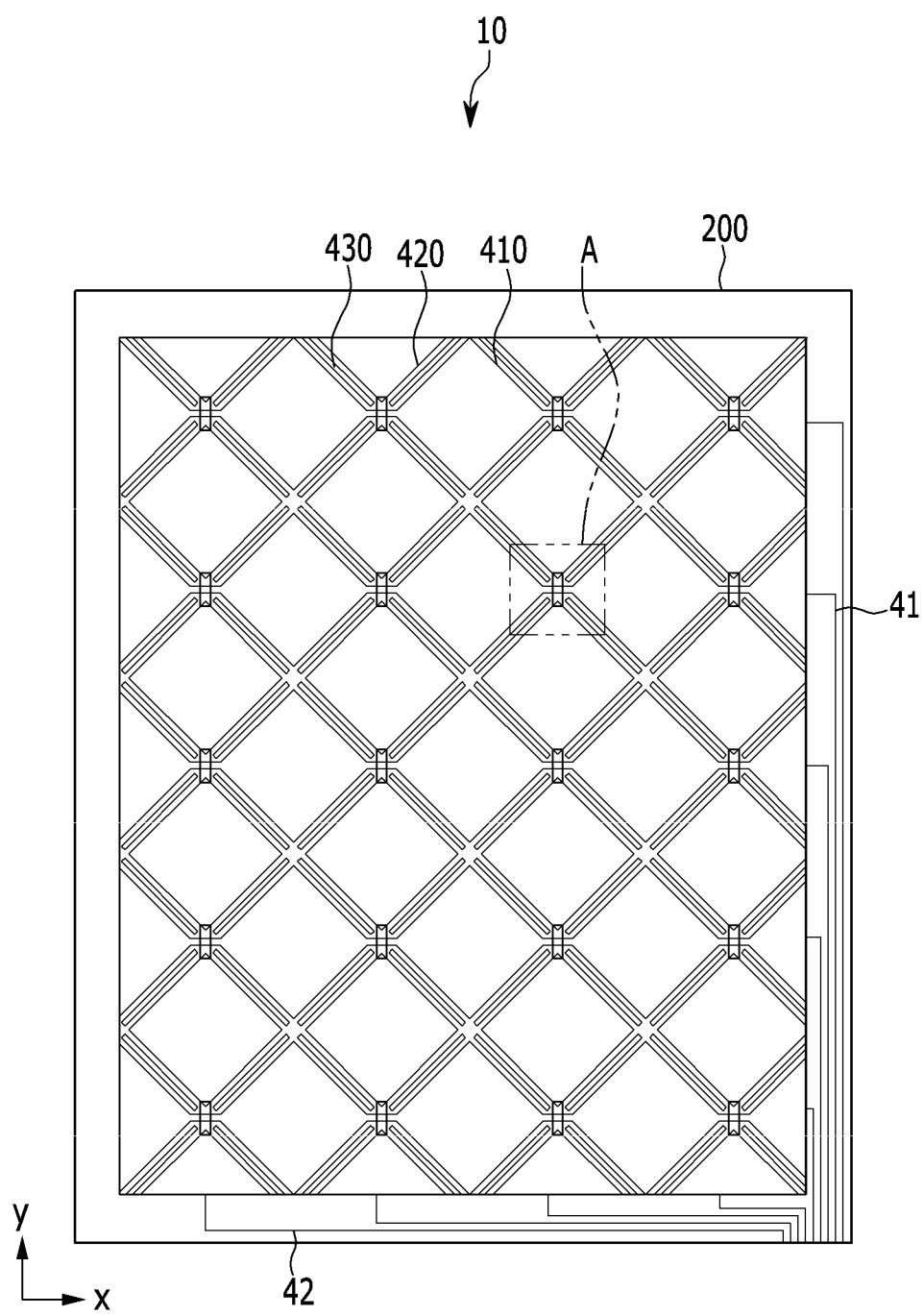
FIG. 1 is a plan view of a touch panel according to an exemplary embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

A touch panel according to an exemplary embodiment will be described with reference to FIGS. 1, 2, 3, 4, 5, and 6.

Figure 2:
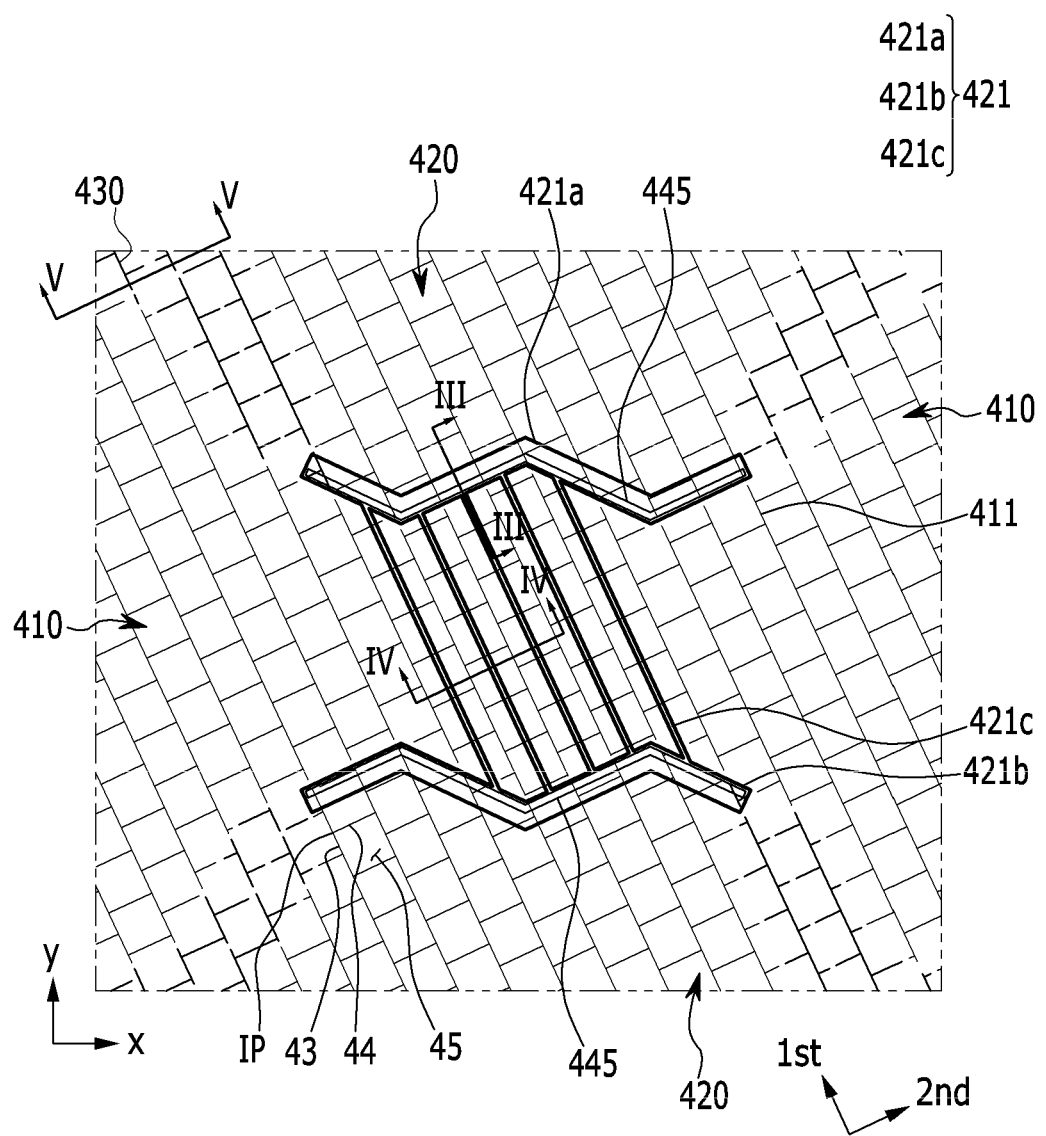
FIG. 2 is an enlarged view of part A of FIG. 1.
Figure 3:
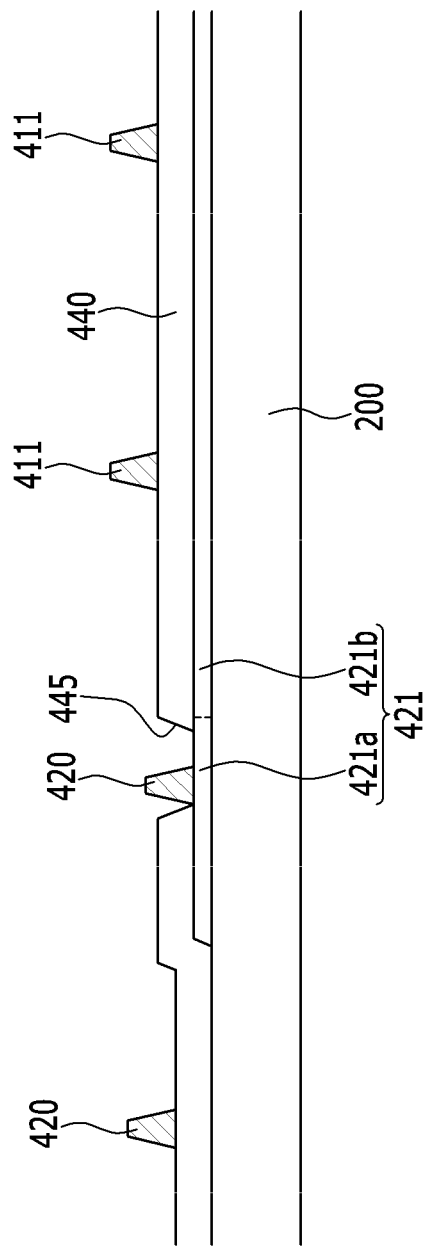
FIG. 3 is a cross-sectional view taken along line III-III of FIG. 2.
Figure 4:
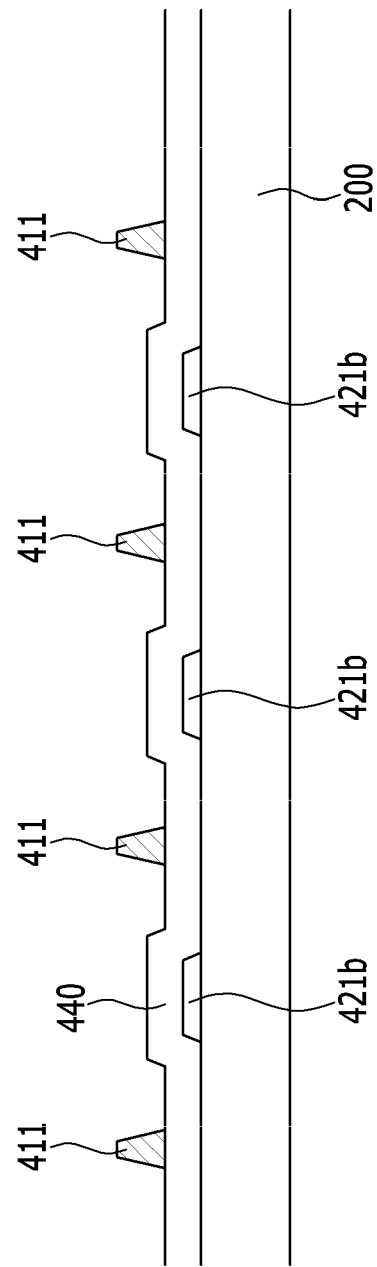
FIG. 4 is a cross-sectional view taken along line IV-IV of FIG. 2.
Figure 5:
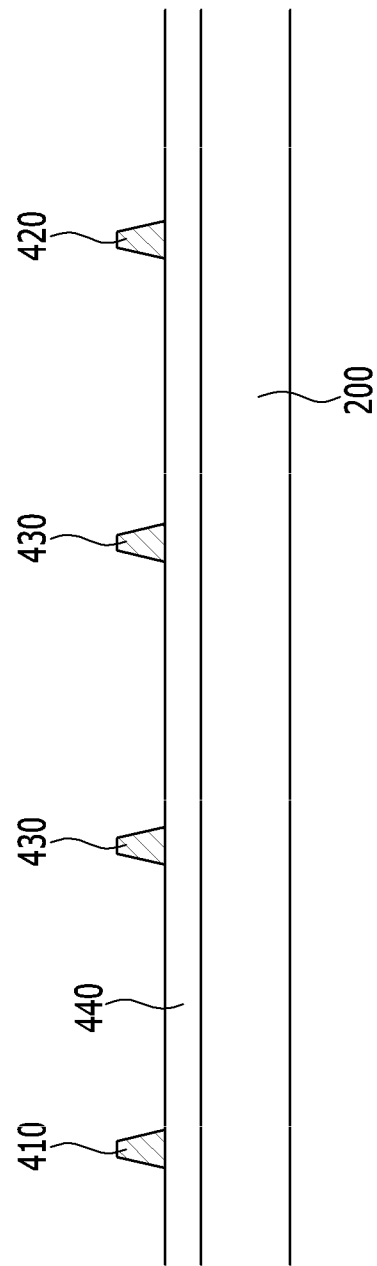
FIG. 5 is a cross-sectional view taken along line V-V of FIG. 2.
Figure 6:
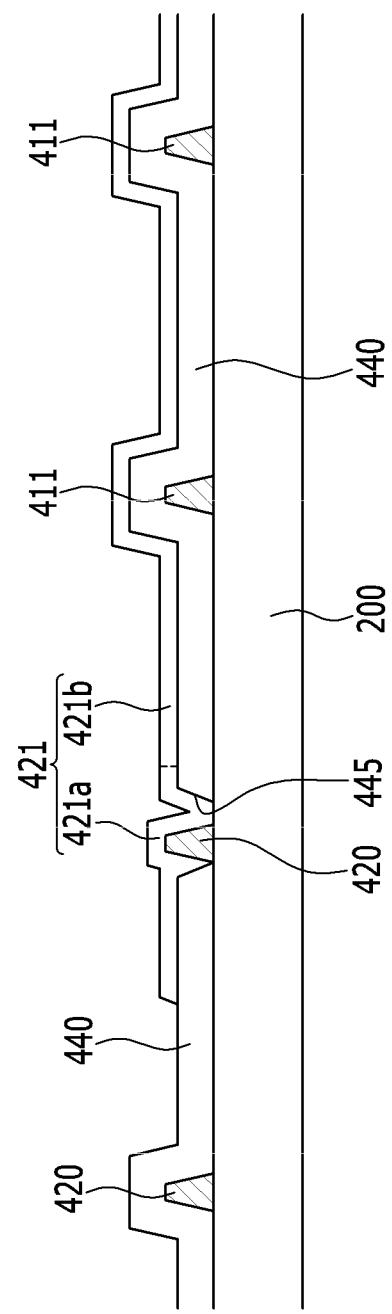
FIG. 6 is a cross-sectional view of a touch panel according to another exemplary embodiment, corresponding to a cross section taken along the line III-III of FIG. 2.

FIG. 1 is a plan view of a touch panel according to an exemplary embodiment, and FIG. 2 is an enlarged view of part A of FIG. 1. FIG. 3 is a cross-sectional view taken along line III-III of FIG. 2, FIG. 4 is a cross-sectional view of line IV-IV of FIG. 2, and FIG. 5 is a cross-sectional view taken along line V-V of FIG. 2. FIG. 6 is a cross-sectional view of a touch panel according to another exemplary embodiment, which corresponds to a cross section taken along line III-III of FIG. 2.

In FIG. 1, an entire form of a touch panel 10 is illustrated. FIG. 1 schematically illustrates an exemplified disposition and connection relationship between components of a panel 10, in which an actual shape, connection structure of components, ratio, interval, etc. of each component are not reflected as they are and some of the components may not be illustrated.

The touch panel 10 includes a substrate 200 and a plurality of touch electrodes 410 and 420 formed on the substrate. The touch electrodes 410 and 420 may be formed on an outer surface of a display panel. The outer surface of the display panel on which the touch panel 10 may be formed on may include pixels for displaying an image in an organic light emitting diode display, a liquid crystal display, or the like. When the touch panel 10 is disposed on the outer surface of the display panel, it may be referred to as an "on-cell type." However, the touch panel 10 may be formed in the display panel, and referred to as an "in-cell type." The touch electrodes 410 and 420 may be formed on a separate substrate formed of a transparent insulator such as glass, plastic, or the like, and may be attached onto the display panel. When the touch electrodes 410 and 420 of the touch panel 10 are formed on a substrate separate from the display panel, it may be referred to as an "add-on type."

The plurality of touch electrodes 410 and 420 form touch sensors for sensing a touch. Here, the touch may include a case in which an object merely approaches the touch panel without touching it (referred to as a "non-contact touch"), as well as a case in which an object contacts the touch panel (referred to as a "contact touch").

The touch electrodes 410 and 420 may include a plurality of first touch electrodes 410 and a plurality of second touch electrodes 420 that are alternately disposed so as not to be overlapped with each other. The plurality of first touch electrodes 410 may be disposed in a row direction (an x-axis direction) and a column direction (a y-axis direction), and the plurality of second touch electrodes 420 may also be disposed in the row direction and the column direction. The touch electrodes 410 and 420 may generally have an approximately rectangular shape. However, the touch electrodes 410 and 420 are not limited to having a rectangular shape, and may also have a circular shape, an oval shape, or a polygonal shape such as a hexagonal shape, or the like. Likewise, the touch electrodes may have various features such as protrusion parts in order to improve sensitivity. Even though the touch electrodes 410 and 420 have the approximately rectangular shape, touch electrodes disposed at edges of the touch panel 10 may have a substantially triangular shape, but exemplary embodiments are not limited thereto.

At least some of the plurality of first touch electrodes 410 arranged in the same row or column may be connected to or electrically separated from each other. Likewise, at least some of the plurality of second touch electrodes 420 arranged in the same row or column may also be connected to or electrically separated from each other. For example, as illustrated in FIG. 1, in the case in which the plurality of first touch electrodes 410 disposed in the same row are connected to each other, the plurality of second touch electrodes 420 disposed in the same column may be connected to each other. Here, the plurality of first touch electrodes 410 positioned in each row may be connected to each other by first connectors 411 to form an electrode row, and the plurality of second touch electrodes 420 positioned in each column may be connected to each other through second connectors 421 to form an electrode column (see FIG. 2). However, exemplary embodiments are not limited thereto. For example, the first touch electrodes 410 may be connected to each other in the column direction, and the second touch electrodes 420 may be connected to each other in the row direction.

The first touch electrode 410 and the second touch electrode 420 may be physically and electrically separated from each other. A dummy electrode 430 is formed in the interval between the first touch electrode 410 and the second touch electrode 420. The dummy electrode 430 may prevent the region in which the first and second touch electrodes 410 and 420 are formed, and the interval therebetween, from being differently visualized due to a difference in reflectivity, etc. The dummy electrode 430 may be in a floating state. According to the exemplary embodiment, the dummy electrode 430 may be also omitted.

Referring to FIGS. 2, 3, 4, and 5, the first touch electrode 410, the second touch electrode 420, and the dummy electrode 430 are formed in a mesh (grid) pattern which is formed by a plurality of conductive lines 43 and 44 intersecting each other The conductive lines 43 and 44 which form the mesh pattern may be made of at least one metal, such as molybdenum (Mo), silver (Ag), titanium (Ti), copper (Cu), aluminum (Ti), titanium/aluminum/titanium (Ti/Al/Ti), and molybdenum/aluminum/molybdenum (Mo/Al/Mo).

Generally, since an area occupied by the electrode (metal line) is smaller than the area occupied by the same size of transparent electrode (e.g., indium tin oxide (ITO), indium zinc oxide (IZO), etc.), the touch electrode in the mesh pattern may reduce parasitic capacitance between the touch electrode and the electrode of the display panel. Further, the metal mesh has relatively high flexibility compared to the flexibility of the transparent electrode and therefore may be more suitable for a flexible display device.

The mesh pattern is formed by a plurality of conductive lines 43 which extend in a first direction and a plurality of second conductive lines 44 which extend in a second direction between adjacent first conductive lines 43, as shown in FIG. 2. The first direction and the second direction may be substantially orthogonal to each other. An interval between the adjacent first conductive lines 43 may be same or different. An interval between the adjacent second conductive lines 44 may be the same or different. The interval between the adjacent first conductive lines 43 and the interval between the adjacent second conductive lines 44 may also be the same or different.

The adjacent first conductive lines 43 and the adjacent second conductive lines 44 may form a polygon such as a quadrangle and the mesh pattern may include an opening 45 which is defined by the polygon. Therefore, the opening 45 may be a portion where the conductive lines 43 and 44 are not formed in the mesh pattern. A length of one side of the opening 45 corresponding to the interval between the adjacent first conductive lines 43 and the interval between the adjacent second conductive lines 44 may be, for example, tens of μm to hundreds of μm and may have a size of about 100 μm×about 100 μm.

The first conductive line 43 may continuously extend over the touch panel 10 in the first direction. The second conductive line 44 may discontinuously extend over the touch panel 10 in the second direction. Here, continuously extending may refer to extending with perfectly overlapping in a single straight line and discontinuously extending may refer to extending with partial overlapping in one straight line. However, even though continuously extending, the first conductive line 43 may be locally disconnected to electrically separate the first touch electrode 410, the second touch electrode 420, and the dummy electrode 430. The second conductive line 44 may also be disconnected locally. According to the exemplary embodiment, the first conductive line 43 may discontinuously extend and the second conductive line 44 may continuously extend.

When the mesh pattern is formed, three lines are disposed at an intersecting point IP between the first conductive line 43 and the second conductive line 44. In this case, a pixel positioned under the mesh pattern may be covered with the three lines disposed at the intersecting point, but exemplary embodiments are not limited there to. For example, when the mesh pattern is formed in a lattice shape (not illustrated), four lines are present around the intersection point IP between the first conductive line 43 and the second conductive line 44. In this case, the pixel may be covered with four lines around the intersecting point. Therefore, the case where any one of the first and second conductive lines 43 and 44 is discontinuously formed may result in further reduction the luminance deterioration around the intersecting point than in the case where the mesh pattern is formed in the lattice shape. However, according exemplary embodiments, both of the first and second conductive lines 44 may continuously extend and thus the mesh pattern in the lattice shape may be may be formed.

The first direction, which is a direction in which the first conductive line 43 extends, may be different from a row direction (x-axis direction), which is a vertical direction of the touch panel 10, or a column direction (y-axis direction), which is a horizontal direction of the touch panel 10. As a result, the first direction may be different from an arrangement direction of the pixels, which may be positioned under the mesh pattern in a matrix form, and may be a direction inclined at a predetermined angle from the column direction of the pixel. As such, when the direction of the mesh pattern is different from the arrangement direction of the pixel, it is possible to prevent moire, which occurs due to scattering and diffraction of light from the pixel, from being externally visualized. According to the exemplary embodiment shown in FIG. 2, the first conductive line 43 may extend in a column direction.

As shown in FIGS. 2, 3, 4, and 5, the touch panel 10 may have a stacked arrangement in which the first touch electrode 410, the second touch electrode 420, and the dummy electrode 430 are formed in the mesh pattern and are positioned on the insulating layer 440. The insulating layer 440 is formed on the substrate 200. The first touch electrode 410, the second touch electrode 420, and the dummy electrode 430 are electrically separated from one another by a local disconnection of the mesh pattern. A first connection part 411 connecting adjacent first touch electrodes 410 is also positioned on the insulating layer 440. The first connection part 411 may be formed in the mesh pattern like the first touch electrode 410 and may be integrated with the first touch electrode 410. The first connection part 411 is electrically separated from the first touch electrode 410 by the local disconnection of the mesh pattern. The first touch electrode 410, the second touch electrode 420, the dummy electrode 430, and the first connection part 411 are formed from one conductive layer, such as a metal layer, that is patterned. As a result, the first touch electrode 410, the second touch electrode 420, the dummy electrode 430, and the first connection part 411 may be simultaneously formed.

The second connection part 421 is positioned beneath the insulating layer 440. The adjacent second touch electrodes 420 are connected to the second connection part 421 through a contact hole formed on the insulating layer 421 and thus are electrically connected to each other. Even though the first connection part 411 and the second connection part 421 intersect each other, they are physically and electrically separated from each other by the insulating layer 440.

According to an exemplary embodiment and referring to FIGS. 2 and 3, the first connection part 411 may be positioned on the substrate 200, together with the first and second touch electrodes 410 and 420, the insulating layer 440 and the second connection part 421 may be sequentially positioned thereon, and the contact part 421a of the second connection part 421 may be connected to the second touch electrode 420 through the contact hole 445 which is formed in the insulating layer 440.

The second connection part 421 may be made of a transparent conductive oxide (TCO), such as indium tin oxide (ITO), and/or indium zinc oxide (IZO). However, the material of the second connection part 421 is not limited to the transparent conductive oxide (TCO) and may be made of a conductive material, such as silver nanowire (AgNW), metal mesh, and/or carbon nanotubes (CNT). The insulating layer 440 may be formed of an inorganic oxide such as a silicon nitride (SiNx), a silicon oxide (SiOx), and/or the like.

The second connection part 421 includes the first and second contact parts 421a and 421b and a leg part 421c connecting therebetween. The first and second contact parts 421a and 421b are connected to each other by the leg part 421c, and therefore the adjacent second touch electrodes 420 each contacting the first and second contact parts 421a and 421b are electrically connected to each other.

The first and second contact parts 421a and 421b overlap each other at opposing edges of the adjacent second touch electrodes 420, respectively. Referring to FIGS. 2 and 3, the insulating layer 440 which is positioned on the first and second contact parts 421a and 421b is provided with a contact hole 445 through which the first and second contact parts 421a and 421b are partially exposed and the adjacent second touch electrodes 420 are connected to the first and second contact parts 421a and 421b through the contact hole 445. The first and second contact parts 421a and 421b may be relatively long to ensure a large contact area with the second touch electrode 420 and may be bent, for example, to form a W shape. The case where the first and second contact parts 421a and 421b are bent may not be visualized or may be less visualized by a user than if the first and second contact parts 421a and 421b are straight. The contact hole 445 which is formed on the insulating layer 440 may be formed along the shape of the first and second contact parts 421 and 421b, for example, may be a W shape.

The leg part 421 connecting the first and second contact parts 421a and 421b may overlap the first connection part 411, having the insulating layer 440 disposed therebetween. Since the leg part 421c overlaps the first connection part 411, a capacitor may be formed by the leg part 421c and the first connection part 411. The capacitor may increase base capacitance of the touch sensor to have parasitic capacitance which reduces touch sensitivity.

According to the exemplary embodiment, the leg part 421c is formed to minimize the parasitic capacitance. The capacitance is in response to the area of the overlapped electrode, and therefore, when a width of the leg part 421c connecting the first and second contact parts 421a and 421b is narrow, the overlapped area with the first connection part 411 may be reduced. Further, the first connection part 411 is formed in the mesh pattern, and therefore the larger the overlapped area between the leg part 421c and the opening 45 of the mesh pattern, the smaller the overlapped area between the conductive lines 43 and 44 of the mesh pattern, thereby reducing the parasitic capacitance. To this end, the leg part 421c overlaps the opening 45 in the mesh pattern and the second conductive line 44 but is formed so as not to overlap the first conductive line 43. That is, when the width of the leg part 421c is larger than that of the opening 45, the leg part overlaps the first conductive line 43, and therefore the width of the leg part 421c according to exemplary embodiments may be formed to be narrower than that of the opening 45. If the leg part 421c extends in a direction different from the direction in which the first conductive line 43 of the mesh pattern extends, the leg part may overlap the first conductive line 43. Accordingly, according to exemplary embodiments, the leg part 421c may extend in the first direction or substantially the same direction in the first direction.

As described above, when the leg part 421c is formed, the overlapping area with the conductive lines 43 and 44 of the mesh pattern may be minimized, thereby minimizing the parasitic capacitance. Thus, the parasitic capacitance may be reduced and the touch sensitivity may be increased. Accordingly, the driving margin may be improved and, for example, a maximum frequency of the driving signal may be increased, thereby securing a high report rate.

As illustrated in FIG. 2, the plurality of leg parts 421c may be formed to be parallel with each other. In this case, each leg part 421c overlaps the opening 45 in the mesh pattern and the second conductive line 44 but does not overlap the first conductive line 43. When the leg part 421c is formed in plural, a resistance of the leg part 421c may be reduced and even if any one of the leg parts may become electrically disconnected due to, for example, static electricity, other leg parts may connect between the first and second contact parts 421 and 421b.

The leg part 421c may be integrally formed with the first and second contact parts 421a and 421b. According to an exemplary embodiment, the leg part 421c may be made of a material different from that of the first and second contact parts 421a and 421b. For example, the first and second contact parts 421a and 421b may be made of the transparent conductive oxide (TCO) and the leg part 421c may be made of metal.

The exemplary embodiment in which the first and second touch electrodes 410 and 420 and the first connection part 411 are formed as the same layer in the mesh and the second connection part 421 is formed in another layer, having the insulating layer disposed therebetween is described above. However, exemplary embodiments are not limited thereto. For example, the first and second touch electrodes 410 and 420 and the second connection part 421 may be formed as the same layer in the mesh pattern and the first connection part 411 may be formed in a different layer, having the insulating layer disposed therebetween.

According to an exemplary embodiment, the first touch electrode 410 and the second touch electrode 420 may be positioned in different layers. In this case, the first connection part 411 may be integrally formed in the same layer as the first touch electrode 410, and the second connection part 421 may be integrally formed in the same layer as the second touch electrode 420. There may be various modified examples for connecting between the touch electrodes so that the first and second touch electrodes 410 and 420 are insulated from each other.

Again referring to FIG. 1, the first touch signal lines 41 are connected to one end of each electrode row, and the second touch signal lines 42 are connected to one end of each electrode column. According to an exemplary embodiment, the touch signal lines 41 and 42 may be connected to both ends of the electrode rows and/or the electrode columns. The respective touch electrodes 410 and 420 may transmit driving signals and output signals to a touch sensor controller (not illustrated) through these touch signal lines 41 and 42.

The first and second touch signal lines 41 and 42 may be formed of a metal material such as molybdenum (Mo), silver (Ag), titanium (Ti), copper (Cu), aluminum (Al), molybdenum/aluminum/molybdenum (Mo/Al/Mo), and/or the like. The first and second touch signal lines 41 and 42 may be made of the same material as the mesh pattern, but is not limited thereto.

The first and second touch electrodes 410 and 420 neighboring to each other form a mutual sensing capacitor serving as a touch sensor. The mutual sensing capacitor may receive the driving signal through one of the first and second touch electrodes 410 and 420 and output a change in a quantity of electrical charge due to a contact of an external object as an output signal through the other touch electrode. For example, the first touch electrode 410 may be an input electrode Tx and the second touch electrode 420 may be an output electrode Rx, or vice versa. One of the first and second touch signal lines 41 and 42 may transmit the driving signal from the touch sensor controller to the first touch electrode 410 or the second touch electrode 420, and the other thereof transmits the output signal from the second touch electrode 420 or the first touch electrode 410 to the touch sensor controller.

Although not shown in the drawings, the plurality of first touch electrodes 410 may be electrically separated from each other and the plurality of second touch electrodes 420 may be electrically separated from each other to form independent touch electrodes and may be connected to touch sensor controllers through their touch signal lines (not illustrated). In this case, the respective touch electrodes may form self-sensing capacitors serving as touch sensors. The self-sensing capacitor may receive the driving signal to be charged with a predetermined quantity of electrical charge, and generate a change in the quantity of charged electric charge when a contact of the external object is present, thereby outputting an output signal different from the received input signal.

Figure 7:
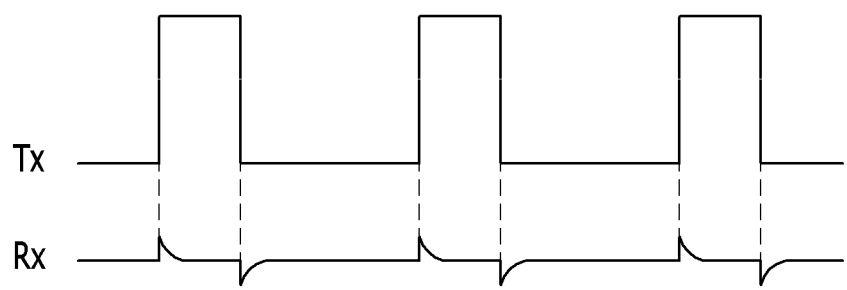
FIG. 7 is a waveform diagram illustrating a signal applied to a touch sensor according to an exemplary embodiment.
Figure 8:
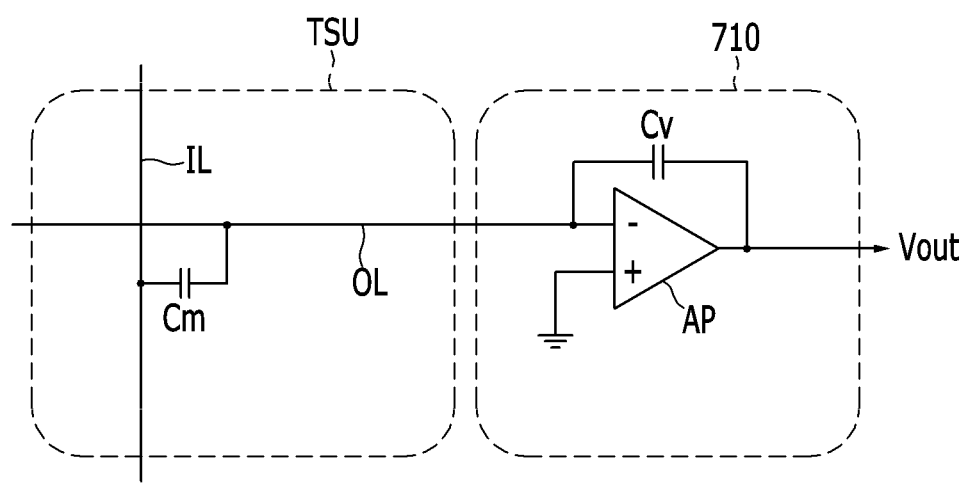
FIG. 8 is a circuit diagram of a touch sensor and a touch signal processor according to an exemplary embodiment.

FIG. 7 is a waveform diagram illustrating a signal applied to a touch sensor according to an exemplary embodiment, and FIG. 8 is a circuit diagram of the touch sensor and a touch signal processor according to an exemplary embodiment.

Referring to FIG. 7 and FIG. 1, the first touch electrode 410 may be an input electrode Tx, and the second touch electrode 420 may be an output electrode Rx, or vice versa according to an exemplary embodiment.

The driving signal is applied to the input electrode Tx. The driving signal may have various waveforms and voltage levels, including, for example, periodically output pulses, and may include at least two different voltage levels. A direct current (DC) voltage may be applied to the output electrode Rx. For example, the input electrode Tx may be applied with a square wave which is swung to about 0V and about 3V and the output electrode Rx may be applied with a DC voltage of about 1.5 V. Even though the DC voltage is applied to the output electrode Rx, a voltage is varied by coupling with the swung driving signal. An electric field and a capacitance are generated due to a potential difference between the input electrode Tx and the output electrode Rx. Since an amount of a voltage variation of the output electrode Rx is changed when the capacitance is changed by a contact of a finger, a touch pen, or the like, the touch may be sensed based on this change.

As a variation of capacitance at the time of a touch with a base capacitance is increased, the sensitivity of the touch sensor may be increased. The parasitic capacitance which occurs among the input electrode Tx or a connection part thereof and the output electrode Rx or a connection thereof increases the base capacitance, and thus the sensitivity of the sensor deteriorates. Therefore, to improve the sensitivity, the parasitic capacitance may be reduced.

An operation of a touch sensor will be described in terms of a circuit with reference to FIG. 8. One touch sensor unit TSU that may be, for example, a combination of one first touch electrode 410 and one second touch electrode 420 illustrated in FIG. 1. The touch sensor unit TSU may include the sensing capacitor Cm including an input line IL that may correspond to the first touch electrode 410 and an output line OL that may correspond to the second touch electrode 420. The sensing capacitor Cm may include an overlap sensing capacitor formed by an overlap between the input line IL and the output line OL, or a fringe sensing capacitor configured by disposing the input line IL and the output line OL to neighbor each other without being overlapped with each other.

The touch sensor unit TSU may receive the driving signal transferred by the input line IL and may output the change in the quantity of electric charge of the sensing capacitor Cm caused by the contact of the external object as the output signal.

In detail, when the driving signal is input to the touch sensor unit TSU, the sensing capacitor Cm is charged with a predetermined quantity of electric charge, and when the contact of the external object is present, the quantity of electric charge charged in the sensing capacitor Cm is changed, such that a signal depending on the change is output to the output line OL. A difference between the output signals in the case in which the object contacts the touch panel and in the case in which the object does not contact the touch panel may be approximately in proportion to a change quantity of electric charge in the sensing capacitor Cm.

A signal processor 710 of the touch sensor may receive the output signal from the output line OL and may process the output signal to determine touch information such as whether or a touch is made, a touch position, and the like. To this end, the signal processor 710 may include a plurality of amplifiers AP connected to the output line OL. The amplifier AP may include a capacitor Cv connected between an inverting terminal − and an output terminal thereof. A non-inverting terminal + of the amplifier AP is connected to a predetermined voltage such as a ground voltage, or the like, and the inverting terminal − thereof is connected to the output line OL. The amplifier AP, which may be an integrator, may integrate the output signal from the output line OL for a predetermined time (for example, one frame) to generate a detection signal Vout.

Figure 9:
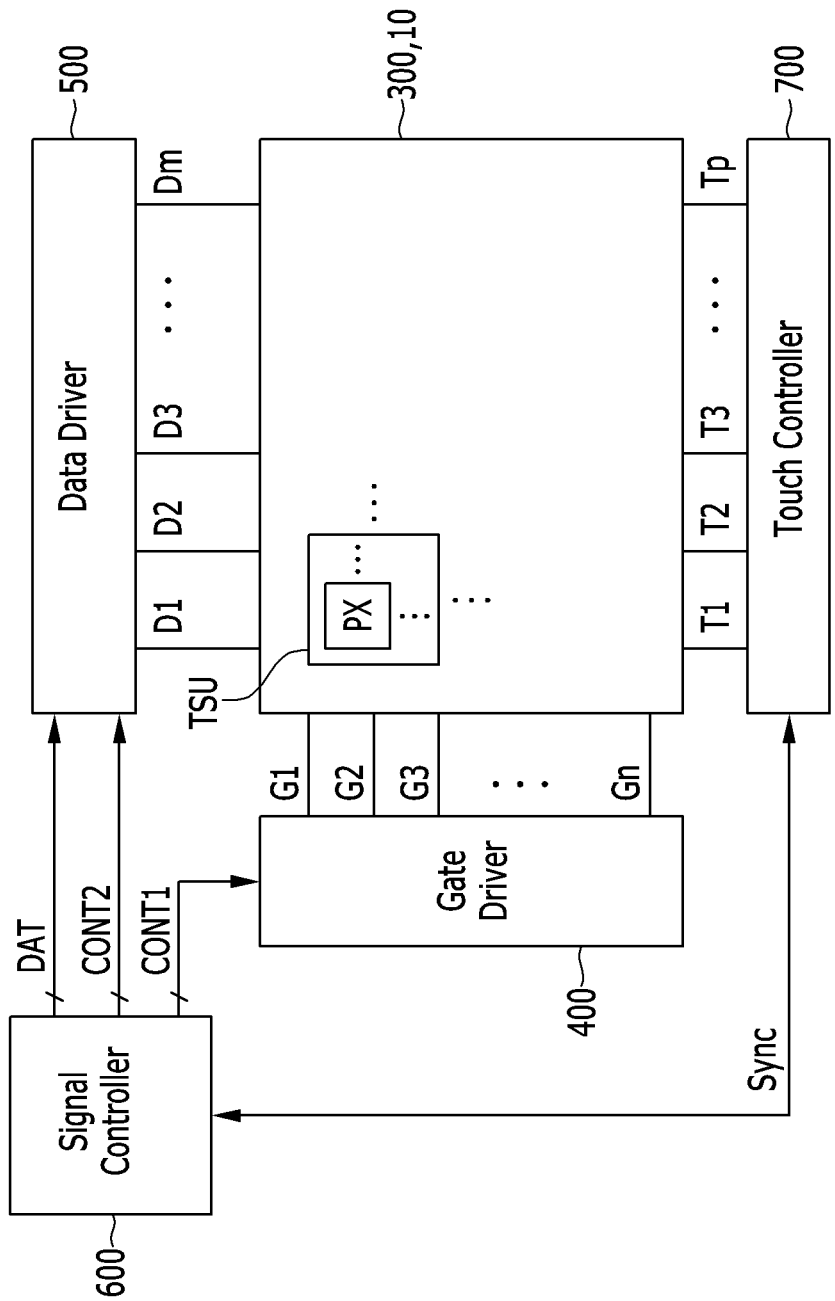
FIG. 9 is a layout view of a display device including the touch panel according to an exemplary embodiment.

FIG. 9 is a layout view of a display device including the touch panel according to an exemplary embodiment.

Referring to FIG. 9, a display device including a touch panel according to an exemplary embodiment includes a display panel 300, a gate driver 400 and a data driver 500 connected to the display panel 300, and a display controller 600 controlling the gate driver 400 and the data driver 500. The display device further includes a touch panel 10 and a touch sensor controller 700 controlling the touch panel 10. Although the touch panel 10 in which the touch electrodes are formed may be attached onto an outer surface of the display panel 300, exemplary embodiments are not limited thereto. For example, the touch electrodes may be directly formed on the display panel 300 or in the display panel 300, such that the display panel 300 may become the touch panel 10.

The display panel 300 includes a plurality of gate lines G1 to Gn, a plurality of data lines D1 to Dm, and a plurality of pixels connected to the plurality of gate lines G1 to Gn. The plurality of data lines D1 to Dm and gate lines G1 to Gn are arranged to form an approximately matrix form. The touch panel 10 includes a plurality of touch signal lines T1 to Tp and a plurality of touch sensor units TSUs connected to the plurality of touch signal lines T1 to Tp and arranged in an approximately matrix form. The touch sensor units TSUs are formed by the first and second touch electrodes 410 and 420 described above.

The gate lines G1 to Gn extend in an approximately horizontal direction and may transfer gate signals including gate-on voltages turning on switching devices such as thin film transistors (TFTs) connected to the respective pixels PXs and gate-off voltages turning off the switching devices. The data lines D1 to Dm extend in an approximately vertical direction and may transfer data voltages. When the switching devices are turned on by the gate-on voltages, the data voltages applied to the data lines are applied to the pixels.

The pixel is a minimum unit displaying an image, and one pixel may uniquely display one of primary colors or a plurality of pixels may alternately display the primary colors over time to display a color by the spatial and temporal sum of these primary colors. The pixel PX may be a quadrangle in shape but is not limited thereto. A common voltage and the data voltages are applied to each pixel PX.

The touch signal lines T1 to Tp are connected to the touch sensor units TSUs to transfer driving signals and output signals to the touch sensor units TSUs. Some of the touch signal lines T1 to Tp may be input lines transferring the driving signals to the touch sensor units TSUs, and the others thereof may be output lines transferring the output signals from the touch sensor units TSUs.

The touch sensor units TSUs may generate the output signals in response to a touch in a mutual capacitance scheme. The touch sensor units TSUs may receive the driving signals from the touch signal lines T1 to Tp and may output the output signals based on the change in the capacitance by the touch of the external object such as the finger, the pen, or the like, through the touch signal lines T1 to Tp. The touch sensor units TSUs may also be operated in a self-capacitance scheme.

The display controller 600 may receive input image signals R, G, and B from an external graphic processor (not illustrated). The display controller 600 may further receive control signals CONT of the input image signals, including a horizontal synchronization signal Hsync, a vertical synchronization signal Vsync, a clock signal CLK, a data enable signal DE, and the like. The display controller 600 processes the image signals R, G, and B based on the image signals R, G, and B and the control signals CONT so as to be appropriate for an operation condition of the display panel 300 and then generates and outputs image data DATA, gate control signals CONT1, data control signals CONT2, and clock signals. The display controller 600 may also output synchronization signals Sync to the touch sensor controller 700 and may receive touch information from the touch sensor controller 700.

The gate control signal CONT1 may include a start pulse vertical signal SVT indicating a start of the gate signal and a clock pulse vertical signal CPV that becomes a reference in generating the gate-on signal. An output period of the start pulse vertical signal SVT may coincides with 1 frame (or refresh rate). The gate control signal CONT1 may further include an output enable signal OE defining duration of the gate-on voltage.

The data control signal CONT2 may include a start pulse horizontal signal STH indicating a transmission start of the image data DAT for pixels in one row, a load signal TP allowing corresponding data voltages to be applied to the data lines D1 to Dm. In the case in which the display panel 200 is a liquid crystal display panel, the data control signals CONT2 may further include a reversion signal RVS reversing a polarity of the data voltage for the common voltage.

The gate driver 400 may applies the gate signals, which are the gate-on voltages and the gate-off voltages, to the gate lines G1 to Gn depending on the gate control signals CONT1.

The data driver 500 may receive the data control signal CONT2 and the image data from the controller 600, and may convert the image data DAT into a data voltage using a gray scale voltage generated in a gray scale voltage generator (not illustrated). The data driver may then apply the data voltage to the data lines D1 to Dm.

The touch sensor controller 700 may transmit input signals to the touch sensor units TSUs and may receive output signals from the touch sensor units TSUs to generate the touch information. The touch sensor controller 700 may include a signal processor 710 processing the output signals from the touch sensor units TSUs.

According to exemplary embodiments, it is possible to reduce the parasitic capacitance of the touch panel, in particular, the parasitic capacitance occurring between the connection part of the touch electrode and the mesh pattern. As a result, it is possible to increase the signal-to-noise ratio of the whole touch panel, thereby improving the driving margin.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch panel, comprising:
   a substrate;
   first touch electrodes and second touch electrodes disposed on the substrate and formed in a mesh pattern;

first connection parts electrically connecting adjacent first touch electrodes and formed in the mesh pattern; and second connection parts electrically connecting adjacent second touch electrodes, wherein each of the second connection parts comprises:
  a first contact part and a second contact part each having a bent shape in a plane view, the first contact part overlapping one of the adjacent second touch electrodes and the second contact part overlapping the remaining one of the adjacent second touch electrodes; and
  at least one leg part connecting the first contact part and the second contact part, and wherein a width of the leg part is less than a width of an opening in the mesh pattern.

2. The touch panel of claim 1, wherein:
the mesh pattern comprises:
  first conductive lines extending in a first direction; and
  second conductive lines extending in a second direction intersecting the first direction and connected between adjacent first conductive lines, and the leg part extends in the first direction.

3. The touch panel of claim 2, wherein:
the leg part does not overlap the first conductive line in a plane view.

4. The touch panel of claim 2, wherein:
the width of the opening of the mesh pattern is a distance between the adjacent first conductive lines.

5. The touch panel of claim 2, wherein:
the first direction is a direction inclined from a vertical direction of the touch panel.

6. The touch panel of claim 1, wherein:
the second connection part comprises more than one leg part.

7. The touch panel of claim 1, wherein:
the mesh pattern comprises a metal material.

8. The touch panel of claim 1, wherein:
the second connection part comprises a transparent conductive oxide.

9. The touch panel of claim 1, wherein:
the first and second contact parts have a W shape in a plane view.

10. The touch panel of claim 1, wherein:
the first and second touch electrodes and the first connection parts are positioned in a same layer.

11. The touch panel of claim 10, wherein:
the second connection part is positioned in a different layer from the second touch electrode, having an insulating layer disposed therebetween, and
the second touch electrode is electrically connected to the first or second contact parts through a contact hole in the insulating layer.

12. The touch panel of claim 11, wherein:
the second connection part overlaps the first connection part in a plane view.

13. The touch panel of claim 11, wherein:
the contact hole has a W shape in a plane view.

14. The touch panel of claim 1, wherein:
a width of the first or second contact parts is larger than that of the leg part.

15. The touch panel of claim 1, further comprising:
a dummy electrode disposed between the first touch electrode and the second touch electrode, the first touch electrode and second touch electrode disposed adjacent to each other and formed in a mesh pattern.

16. A touch panel, comprising:
a substrate;
first touch electrodes and second touch electrodes disposed on the substrate and formed in a mesh pattern;
first connection parts electrically connecting adjacent first touch electrodes and formed in the mesh pattern; and
second connection parts electrically connecting adjacent second touch electrodes,
wherein each of the second connection parts comprises:
  a first contact part overlapping one of the adjacent second touch electrodes and a second contact part overlapping the remaining one of the adjacent second touch electrodes; and
  at least one leg part connecting the first contact part and the second contact part, wherein the mesh pattern comprises:
    first conductive lines extending in a first direction inclined from a vertical direction of the touch panel; and
    second conductive lines extending in a second direction intersecting the first direction and connected between adjacent first conductive lines, and
wherein the leg part extends in the first direction.

17. The touch panel of claim 16, wherein a width of the leg part is less than a width of an opening in the mesh pattern.

18. A touch panel, comprising:
a substrate;
first touch electrodes and second touch electrodes disposed on the substrate and formed in a mesh pattern;
first connection parts electrically connecting adjacent first touch electrodes and formed in the mesh pattern;
second connection parts electrically connecting adjacent second touch electrodes; and
an insulating layer disposed between the second touch electrodes and the second connection parts,
wherein each of the second connection parts comprises:
  a first contact part overlapping one of the adjacent second touch electrodes and a second contact part overlapping the remaining one of the adjacent second touch electrodes; and
  at least one leg part connecting the first contact part and the second contact part, and
wherein a second touch electrode of the second touch electrodes is electrically connected to one of the first and second contact parts through a contact hole formed in the insulating layer, the contact hole has a W shape in a plane view.

19. The touch panel of claim 18, wherein a width of the leg part is less than a width of an opening in the mesh pattern.

* * * * *